United States Patent [19]

Marioni

[11] Patent Number: 5,714,814
[45] Date of Patent: Feb. 3, 1998

[54] SUPPORT FOR THE ROTOR SHAFT OF A CENTRIFUGAL PUMP WITH PERMANENT-MAGNET ELECTRIC MOTOR

[75] Inventor: Elio Marioni, Dueville, Italy

[73] Assignee: Askoll S.p.A., Povolarq Dueville, Italy

[21] Appl. No.: 346,310

[22] Filed: Nov. 23, 1994

[30] Foreign Application Priority Data

Nov. 29, 1993 [IT] Italy ................... PD93A0233
Dec. 7, 1993 [IT] Italy ................... PD930149 U

[51] Int. Cl.⁶ ................... H02K 5/132; H02K 5/12
[52] U.S. Cl. ................... 310/87; 310/86; 310/89;
310/156; 310/266; 310/58; 310/62; 417/423.3;
417/423.11; 417/423.7; 417/423.12; 417/366;
417/372
[58] Field of Search ................... 310/86, 87, 89,
310/43, 62, 58, 52, 266, 156; 417/423.11,
423.3, 423.7, 423.12, 423.14, 366, 372

[56] References Cited

U.S. PATENT DOCUMENTS

| | | | |
|---|---|---|---|
| 3,791,773 | 2/1974 | Maginnis | 417/423 |
| 3,969,043 | 7/1976 | Bright et al. | |
| 4,512,724 | 4/1985 | Horvath | 417/319 |
| 4,738,151 | 4/1988 | Russell et al. | |
| 4,820,410 | 4/1989 | Cavalcante | 210/169 |
| 4,985,181 | 1/1991 | Strada et al. | 261/87 |
| 5,282,727 | 2/1994 | Willinger et al. | 417/423.3 |
| 5,282,961 | 2/1994 | Ellis et al. | 210/169 |

FOREIGN PATENT DOCUMENTS

| | | |
|---|---|---|
| 0021030 | 1/1981 | European Pat. Off. . |
| 2809973 | 9/1979 | Germany . |

Primary Examiner—Thomas M. Dougherty
Assistant Examiner—Karl Eizo Tamai
Attorney, Agent, or Firm—Guido Modiano; Albert Josif; Daniel J. O'Byrne

[57] ABSTRACT

A support for the rotor shaft of a centrifugal pump with permanent-magnet electric motor. The motor is of the type which comprises a laminate-pack stator with a coil-like winding and a rotor placed in a cylindrical chamber which is separate from the stator, the rotor being rotatable about the shaft which is fixed axially therein. The support is characterized in that it comprises a tubular shank which extends from the bottom of the chamber and in which one end of the shaft is force-fitted. The bottom has a through hole at the shank.

11 Claims, 3 Drawing Sheets

SUPPORT FOR THE ROTOR SHAFT OF A CENTRIFUGAL PUMP WITH PERMANENT-MAGNET ELECTRIC MOTOR

BACKGROUND OF THE INVENTION

The present invention relates to a support for the rotor shaft of a centrifugal pump with permanent-magnet electric motor.

Centrifugal pumps are already known, particularly in the field of aquarium keeping, which are substantially constituted by a box-like body which internally forms two hermetically separated chambers: a first chamber for the stator of a permanent-magnet electric motor and a second substantially cylindrical chamber for the rotor of said motor.

The stator is embedded in epoxy resin, which isolates it from the environment in which the pump is placed, that is to say the aquarium.

The box-like body also forms a third chamber, connected to the second one, for an impeller which is connected coaxially to the rotor.

In these pumps, the rotor is rotatable about a steel shaft which is cantilevered and axially fixed at the bottom of the second chamber.

A cap-shaped rubber part is generally interposed between the shaft and the supporting seat and makes the coupling elastic.

During the operation of the pump, the second and third chambers are filled with moving water owing to the rotation of the impeller and, in the case of the second chamber, also owing to the presence of a longitudinal recirculation channel formed in the wall.

The particular operating environment, that is to say the aquarium, entails that sand is suspended in the water; as it passes between the moving parts, this sand causes often early wear, particularly of the shaft.

The steel shaft is furthermore the seat of induced currents which cause the carbonate salts contained in the water to adhere to it; in the course of time, this naturally entails difficulties in the correct operation of the pump.

In order to obviate these drawbacks, shafts made of ceramic material have been produced: as such they withstand the abrasive action of the sand and are not the seat of induced currents that cause scale formation.

However, this has caused the onset of other drawbacks which are due to the fact that the brittleness of the material has made it necessary to fix it at both ends in order to avoid breakages, but this has created problems, making it difficult to replace the shaft in case of breakage due to the difficulty in removing, in particular, the stub which remains rigidly coupled to the support located at the bottom of the chamber.

Cantilevered ceramic shafts in fact break close to the coupling point.

Other drawbacks are due to difficult maintenance: one end support is in fact formed on the .lid of the impeller chamber.

SUMMARY OF THE INVENTION

A principal aim of the present invention is to provide a support for the rotor shaft of a centrifugal pump with a permanent-magnet electric motor that allows to easily, rapidly, and effortlessly replace said shaft in case of breakage.

A consequent primary object is to provide a support that allows to fully exploit the advantages of the installation of ceramic shafts in centrifugal pumps for aquariums or similar environments.

Another important object of the present invention is to provide a centrifugal pump with permanent-magnet motor which features easier maintenance by using a ceramic shaft.

Another object is to provide a centrifugal pump whose technical and constructive concept can also be applied to installations that use shafts made of another material.

Another object is to provide a centrifugal pump whose structure also allows to assemble it more easily than current ones.

Another object is to provide a centrifugal pump that can be manufactured with conventional equipment and facilities.

This aim, these objects, and others which will become apparent hereinafter are achieved by a support for the rotor shaft of a centrifugal pump with permanent-magnet electric motor of the type which comprises a laminate-pack stator with a coil-like winding and a rotor placed in a cylindrical chamber separated from the stator, the rotor being rotatable about a shaft which is fixed axially therein, said support being characterized in that it comprises a tubular shank which extends from the bottom of said chamber and in which one end of said shaft is force-fitted, said bottom having a through hole at said shank.

BRIEF DESCRIPTION OF THE DRAWINGS

Further characteristics and advantages of the invention will become apparent from the following detailed description of two embodiments thereof, illustrated only by way of non-limitative example in the accompanying drawings, wherein.

DESCRIPTION OF THE PREFERRED EMBODIMENTS

Figure 1:
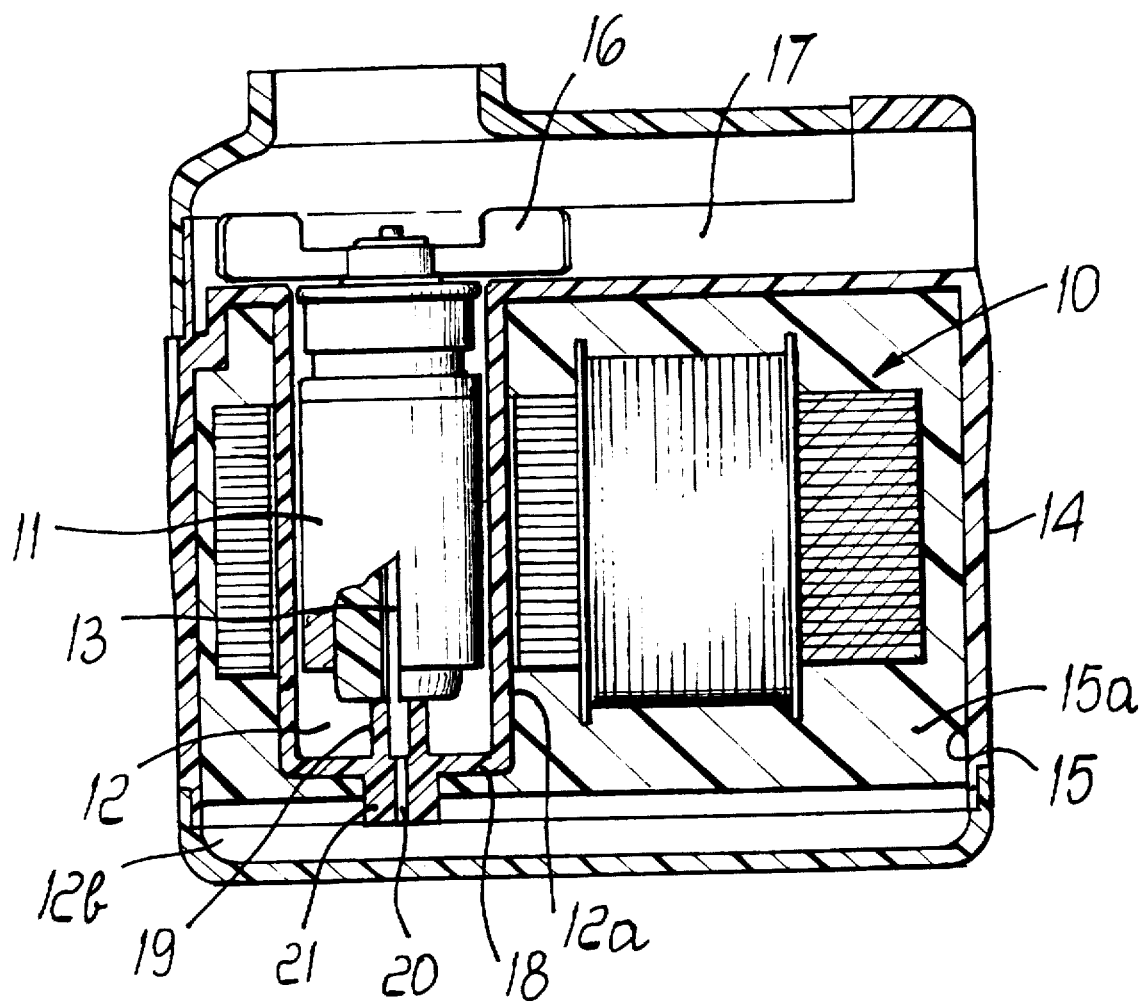
FIG. 1 is a sectional view of a first centrifugal pump with permanent-magnet motor and ceramic shaft, mounted on a support according to the invention.
Figure 2:
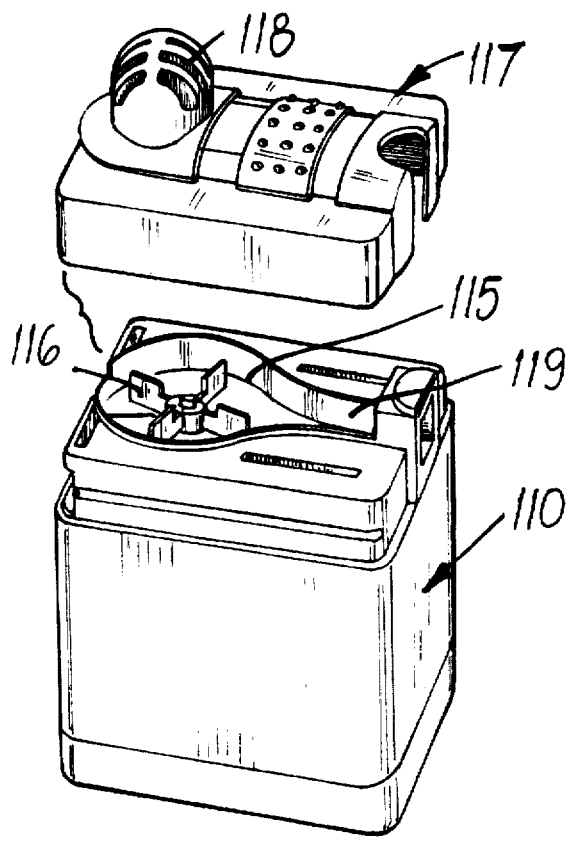
FIG. 2 is a perspective view of a second pump with its lid lifted.
Figure 4:
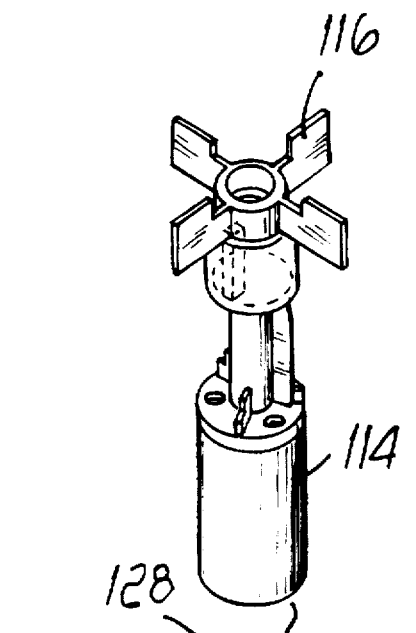
FIG. 4 is an exploded view of the components of the second pump which are assembled inside the rotor chamber.
Figure 3:
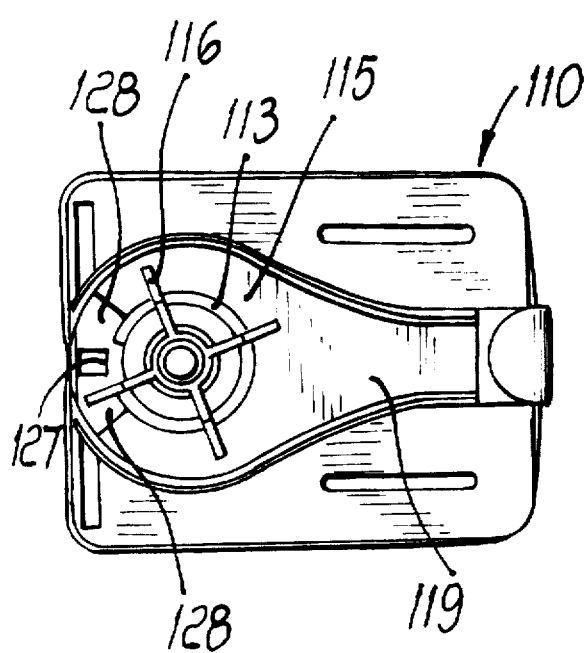
FIG. 3 is a view of the second pump in the region of the impeller chamber, without a lid.
Figure 5:
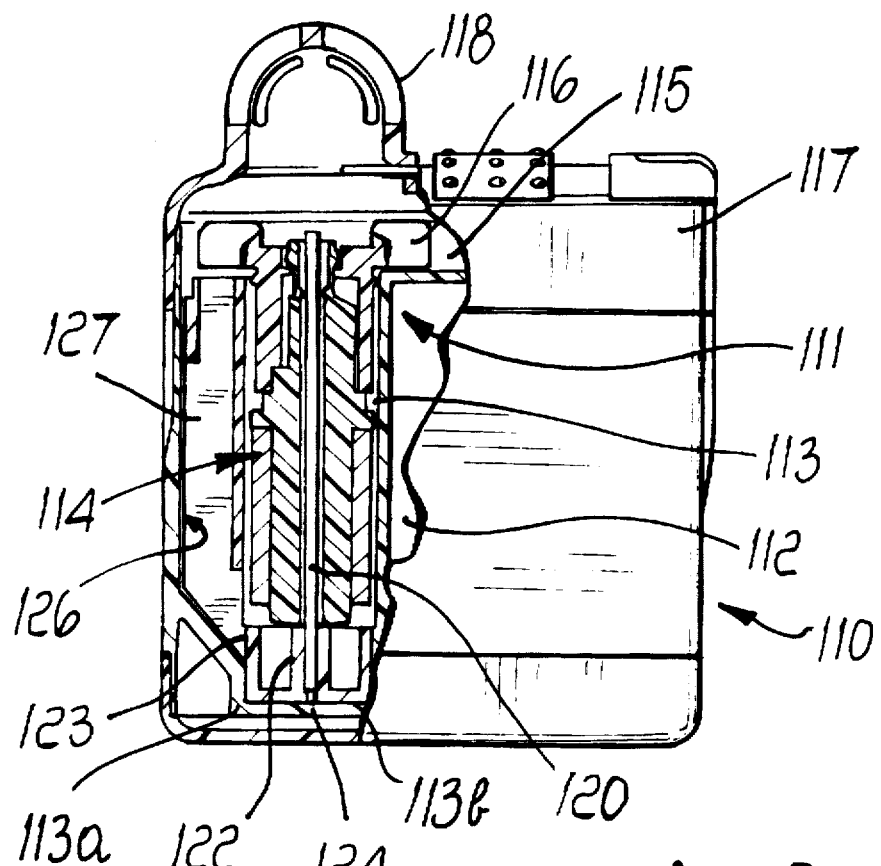
FIG. 5 is a partially sectional side view of the second pump.
Figure 6:
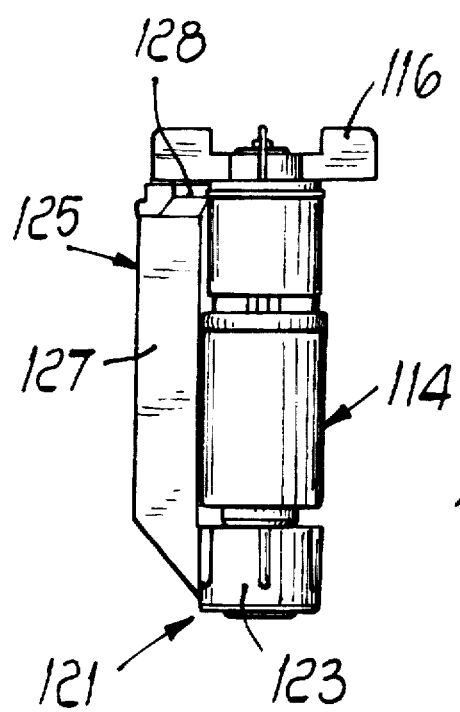
FIG. 6 is a side view of the rotor of the second pump, mounted on the corresponding support.

With reference to the above mentioned FIG. 1, a permanent-magnet electric motor, in a first centrifugal pump for aquariums, comprises a laminate-pack stator 10 with a coil-like winding, which is accommodated in a first chamber 15 formed by a box-like body 14 made of plastics, and a rotor 11, which is placed in a second cylindrical chamber 12 (rotor chamber) formed by a cup-like element 12a which is directly (monolithically) or indirectly associated with the body 14; said rotor is thus separate from the stator 10 and is rotatable about a ceramic shaft 13 which is axially fixed in said second chamber 12.

The stator 10 is conveniently embedded in binary epoxy resin 15a.

The rotor 11 is connected to an impeller 16 which is accommodated in a corresponding third chamber 17 formed in said box-like body 14.

According to the invention, a tubular shank 19 extends axially from the bottom 18 of said element 12a of the rotor 11; one end of said ceramic shaft 13 is force-fitted in said shank 19, and said shaft is thus cantilevered.

Also according to the invention, said bottom 18 has, at the shank 19, a through hole 20 which connects its inside to the inside of a further second shank 21 that protrudes, coaxially to the first shank 19, again from the bottom 18 and emerges from the mass of resin 15a with its free end.

In this manner, the inside of the shank 19 is connected to the outside region 12b of the second chamber.

A thrust force can be applied to the head of the shaft 13 by means of the shank 21 and the hole 20, by using a suitable tool, to extract said shaft from the chamber 12 for maintenance or to extract its portion that has remained rigidly coupled to the shank 19 in case of breakage.

The hole 20 also has the purpose of venting, when the shaft 13 is force-fitted in the shank 19, the air that is present inside said shank and would otherwise be compressed if it had no outlet, thus producing a force that would facilitate extraction.

The shank 19 also constitutes an elastic restraint for the end of the shaft, allowing it to flex with respect to the axis.

With reference now to FIGS. 2 to 6 mentioned above, in a second embodiment a centrifugal pump with permanent-magnet motor comprises a box-like body 110 made of plastics which forms, inside it, two hermetically separated chambers: a first chamber 111 for the stator 112 and a second substantially cylindrical chamber 113 for the rotor 114 of said motor.

The box-like body 110 again forms a third chamber 115, connected to the second chamber 113, for an impeller 116 which is connected to the rotor 114 in a known manner.

The third chamber 115 is closed by a removable lid 117 on which a suction inlet 118, provided with a grille, is formed axially with respect to the impeller 116.

The pump discharge duct 119 is again formed on the box-like body 110.

The rotor 114 and the impeller 116, which are conveniently perforated axially, are rotatable about a ceramic shaft 120 which, according to the invention, is fixed on a support 121 which is made of plastics and is detachably accommodated at the bottom 113a of the second chamber 113.

More particularly, said support 121 comprises a shank 122 in which the shaft 120 is driven; said shank extends axially from the bottom of a cylindrical cup-like element 123 to be inserted in a suitable complementarily shaped seat 113b.

The ceramic shaft 120 is force-fitted inside the shank 122, which has, on its bottom, a hole 124 for venting the air which would otherwise be compressed inside it, producing a force that would facilitate extraction.

A grip element 125 is externally monolithically associated, with one of its ends, with the cup-like element 123, lies axially parallel to the shaft 120, and is accommodated in a corresponding slot 126 which is formed in the wall of the second chamber 113.

The grip element 125 runs up to a region which can be accessed from the third chamber 115.

More particularly, said grip element is constituted by a hollow upright 127 which is open at least at its ends and has a C-shaped cross-section; two oppositely arranged tabs 128 protrude at right angles in an arc-like fashion on the top of said upright.

The tabs 128 are accommodated in a corresponding slot 129 formed between the second chamber 113 and the third chamber 115 and can be accessed to allow to extract the assembly constituted by the support 121 and by the rotor 114 with the impeller 116.

The hollow structure of the upright 127 constitutes water recirculating means and produces water recirculation inside it between the inside of the second chamber 113 and the third chamber 115.

From the above description it is thus evident that if the tabs 128 of the support 121 are lifted, the user can extract the entire part related to the support of the shaft 120 and can easily operate on its engagement element.

If the shaft 120 breaks, its stub can be removed from the shank 122 for replacement by using an appropriate tool through the hole 124.

The shank 122 itself is an elastic element that allows the shaft 120 to perform flexing movements at its base.

As already mentioned earlier, the hole 124 also has the purpose of venting the air inside the shank 122 when the shaft 120 is force-fitted.

In practice it has been observed that the intended aim and objects have been achieved in both embodiments of the invention.

The invention thus conceived is susceptible of numerous modifications and variations, all of which are within the scope of the inventive concept.

All the details may furthermore be replaced with other technically equivalent elements.

In practice, the materials employed, so long as they are compatible with the contingent use, as well as the dimensions, may be any according to the requirements.

What is claimed is:

1. Support for a ceramic rotor shaft of a permanent-magnet electric motor, said motor comprising:
    a first chamber formed by a body made of plastics;
    a second chamber associated with said body and separated from said first chamber, said second chamber including a bottom region thereof;
    a laminate-pack stator with a coil-like winding placed in said first chamber;
    a rotor placed in said second chamber being thereby separated from said stator;
    a shaft being fixed in said second chamber axially with respect to said rotor, said rotor being rotatable around said shaft; and
    an impeller being connected to said rotor for rotating therewith around said shaft;
    wherein said support comprises:
    a shaped element being detachably accommodated at said bottom region of said second chamber;
    a tubular shank extending from said shaped element, an end of said shaft being force-fitted in said shank;
    a through hole extending in said shaped element coaxially to said tubular shank;
    a grip means running axially to a region of said motor being accessible from outside said second chamber,
    said grip means being constituted by a hollow upright which is monolithically associated with an outer part of said shaped element, said hollow upright being accommodated in a suitable slot formed on a wall of said second chamber, said support, said rotor and said impeller forming an assembly, and said grip means being operatable for extracting said assembly from the motor.

2. Support according to claim 1, wherein said shaft is fixed in said shaped element in a cantilevered manner.

3. Support according to claim 2, wherein said shaft replaceable being accessible by said through hole for removal from said shank.

4. Support according to claim 1, wherein said shank extends axially from said shaped element, which is conveniently cup-shaped, said cup-shaped element being accommodated in a complementarily shaped seat of said bottom region of said second chamber.

5. Support according to claim 3, wherein said through hole allows air inside said shank to be vented out when said shaft is force fitted in the shank.

6. Support according to claim 1, wherein said upright is open at least at its ends and provides water recirculation between said second chamber and a third chamber of said motor where the impeller is located.

7. Support according to claim 2, wherein said shank is an elastic element allowing flexing movement of the shaft at a base thereof which is force-fitted in the shank.

8. In a permanent-magnet electric motor for an aquarium centrifugal pump, the motor comprising:

a first chamber formed by a body made of plastics;

a second chamber associated with said body and separated from said first chamber, said second chamber including a closed bottom region thereof and an open region;

a third chamber formed in said body, said third chamber communicating with said second chamber at said open region;

a laminate-pack stator with a coil-like winding placed in said first chamber;

a rotor placed in said second chamber being thereby separated from said stator;

a replaceable shaft being fixed in said second chamber axially with respect to said rotor, said rotor being rotatable around said shaft; and an impeller located in said third chamber and being connected to said rotor for rotating therewith around said shaft;

a support for said shaft comprising:

a shaped element being detachably accommodated at said bottom region of said second chamber;

a tubular shank extending from said shaped element, an end of said shaft being force-fitted in said shank;

a through hole extending in said shaped element coaxially to said tubular shank;

a grip means running axially up to a region of said motor being accessible from said third chamber, said grip means being constituted by a hollow upright which is monolithically associated with an outer part of said shaped element, said hollow upright being accommodated in a suitable slot formed on a wall of said second chamber, said support, said rotor and said impeller forming an assembly, and said grip means being operatable for extracting said assembly from the motor; and water recirculating means constituted by said hollow upright for recirculating aquarium water between said second chamber and said third chamber.

9. Support according to claim 8, wherein said upright is open at least at its ends for constituting said water recirculating means.

10. Support according to claim 8, wherein said shaft is made of a ceramic material, said ceramic shaft being force-fitted in said tubular shank and thus supported in a cantilevered manner in said shaped element.

11. Support according to claim 10, wherein said tubular shank is an elastic element allowing flexing movement of the shaft at a base thereof which is force-fitted in the tubular shank.

* * * * *